United States Patent [19]

Jaroszczyk et al.

[11] Patent Number: 5,106,397
[45] Date of Patent: Apr. 21, 1992

[54] AIR CLEANER/NOISE SILENCER ASSEMBLY

[75] Inventors: Tadeusz Jaroszczyk, Stoughton, Wis.; David A. Olson, Northville, Mich.

[73] Assignee: Ford Motor Company, Dearborn, Mich.

[21] Appl. No.: 772,189

[22] Filed: Oct. 7, 1991

Related U.S. Application Data

[63] Continuation-in-part of Ser. No. 633,928, Dec. 26, 1990.

[51] Int. Cl.$^5$ ............................................. B01D 53/30
[52] U.S. Cl. ......................................... 55/270; 55/276; 55/306; 55/320; 55/498; 55/502; 55/521; 181/276
[58] Field of Search .................. 55/270, 276, 319, 320, 55/306, 355, 498, 502, 521; 181/214, 229, 243, 250, 276

[56] References Cited

U.S. PATENT DOCUMENTS

| | | |
|---|---|---|
| 3,180,712 | 4/1965 | Hamblin . |
| 3,388,535 | 6/1968 | Nash . |
| 3,990,415 | 11/1976 | Malphettes . |
| 4,157,902 | 6/1979 | Tokar . |
| 4,236,901 | 12/1980 | Kato et al. . |
| 4,422,861 | 12/1983 | Dusza . |
| 4,710,297 | 12/1987 | Suzuki et al. . |

FOREIGN PATENT DOCUMENTS 2307142 11/1976 France .

*Primary Examiner*—Charles Hart
*Attorney, Agent, or Firm*—Damian Porcari; Clifford L. Sadler

[57] ABSTRACT

The invention relates to an air cleaner comprising a generally bell-shaped air cleaner housing and a generally frustoconical filter positioned concentrically within the housing. The housing has an air inlet at its small end and an air outlet at its large end for the flow of air generally axially into and out of the housing. The filter has a filter element coaxially juxtaposed the interior surface of the housing. The filter element is generally annular and has an upstream portion and a downstream portion. The downstream portion of a member supportably engages the upstream portion of the filter element. The upstream portion of the filter element has a diameter larger than the diameter of the member downstream portion. The member blocks the flow of air into the interior of the filter element and directs air axially along the exterior of the filter element. A downstream annular support piece engages the downstream end of the filter element. The support piece has an aperture communicating with the outlet and with the interior of the filter element. The support piece sealably engages the interior surface of the housing. Air flowing in an axial direction through the inlet passes over the member, axially along the filter element a distance before passing through into the interior of the element and axially out the outlet.

21 Claims, 6 Drawing Sheets

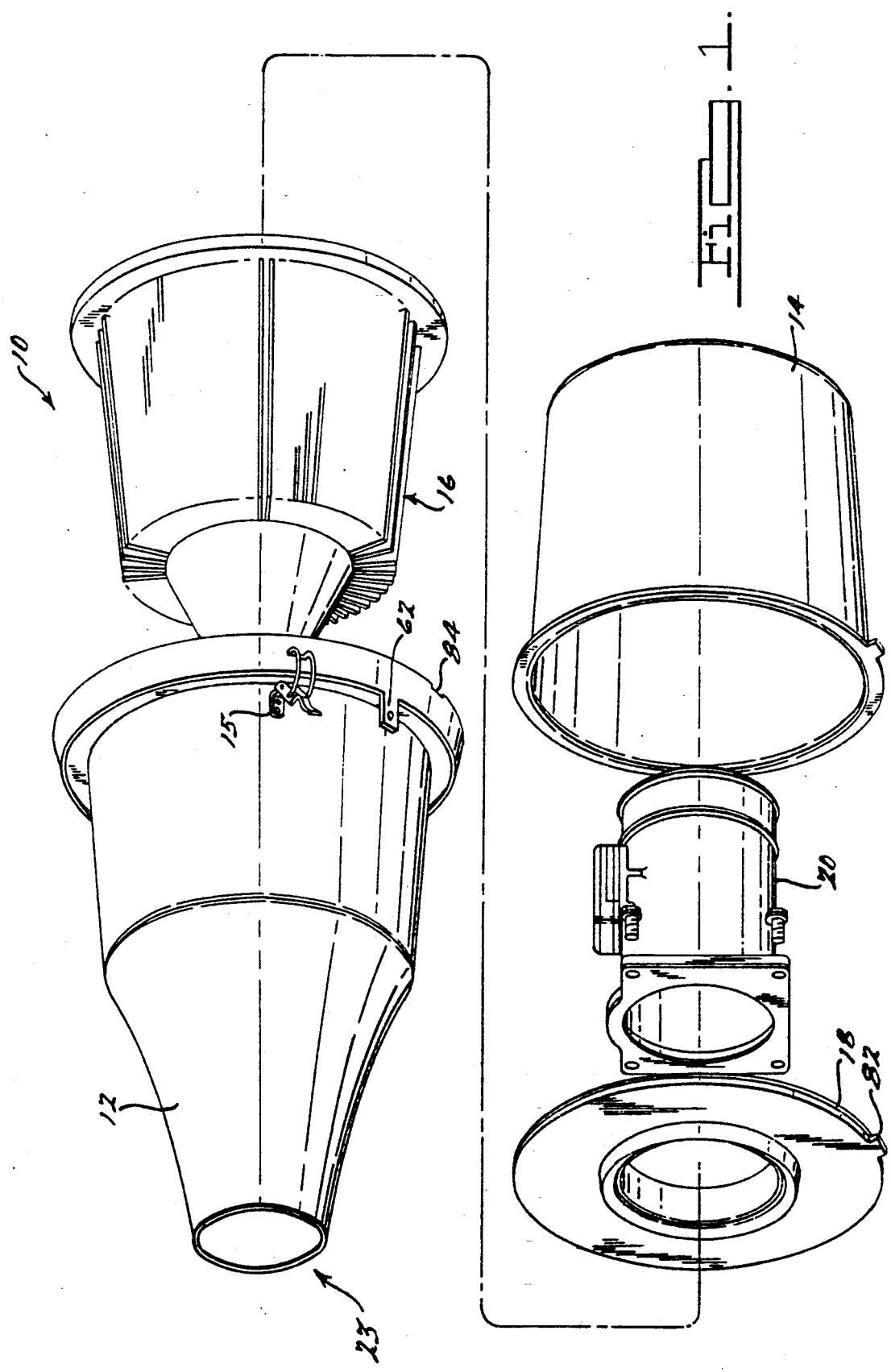

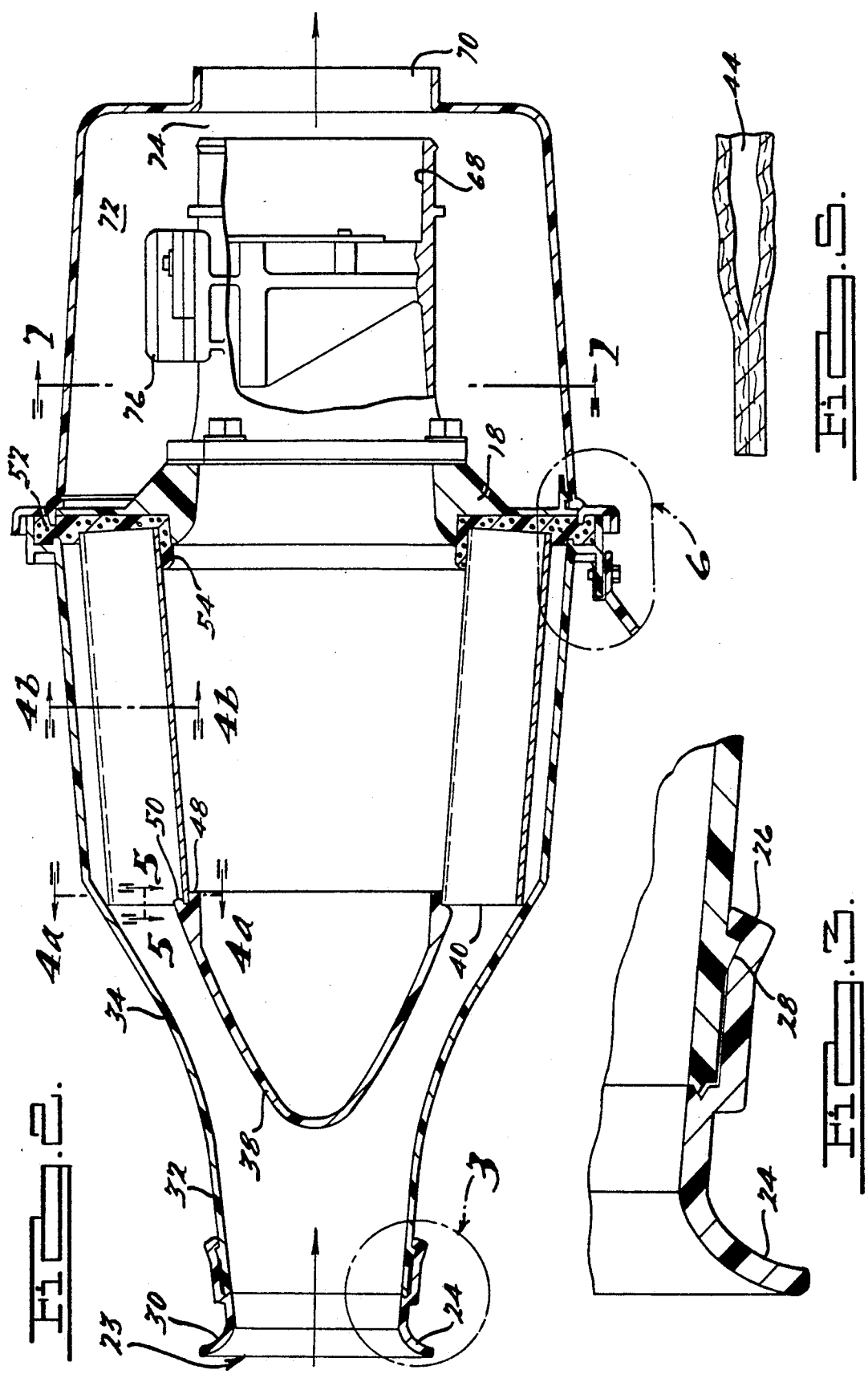

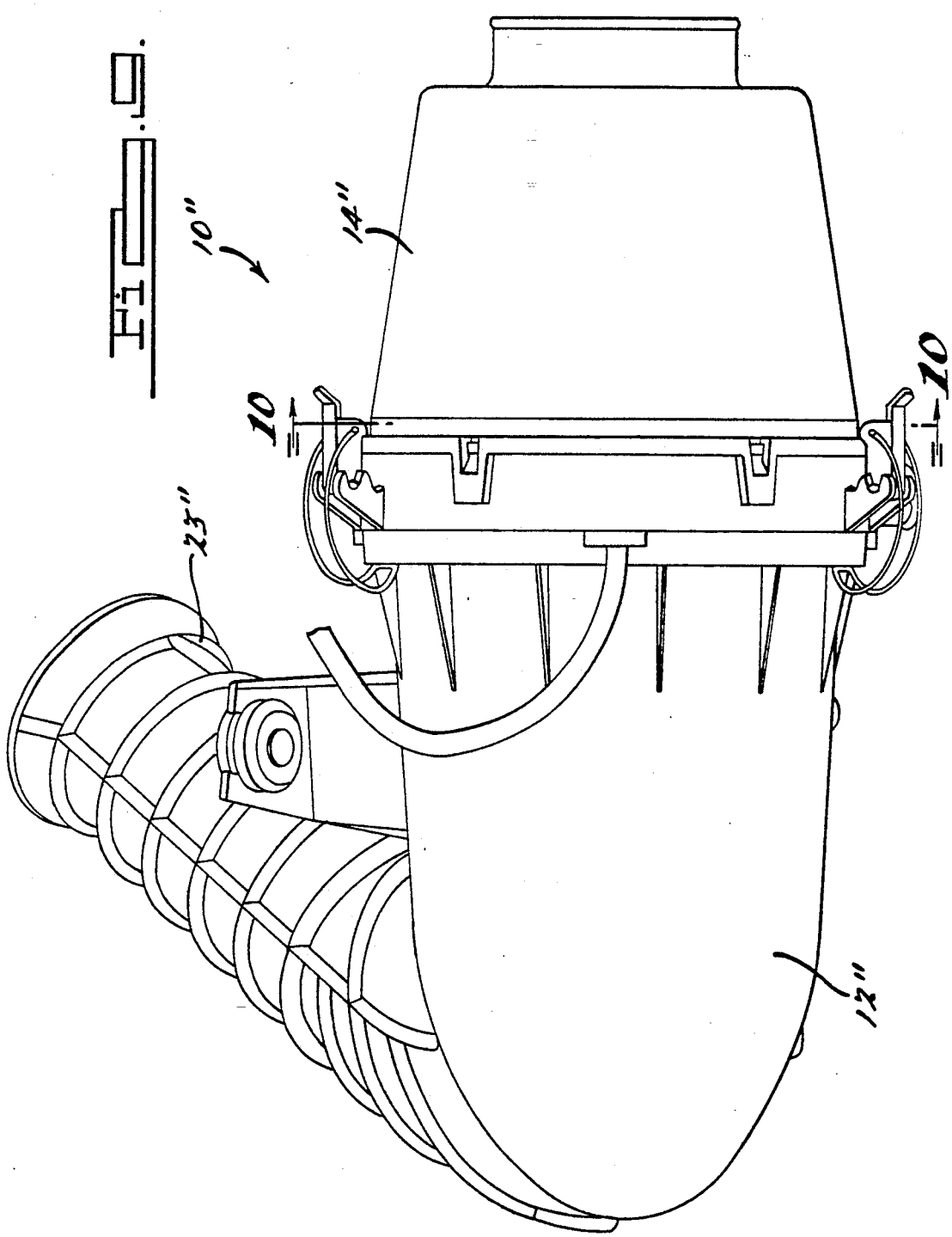

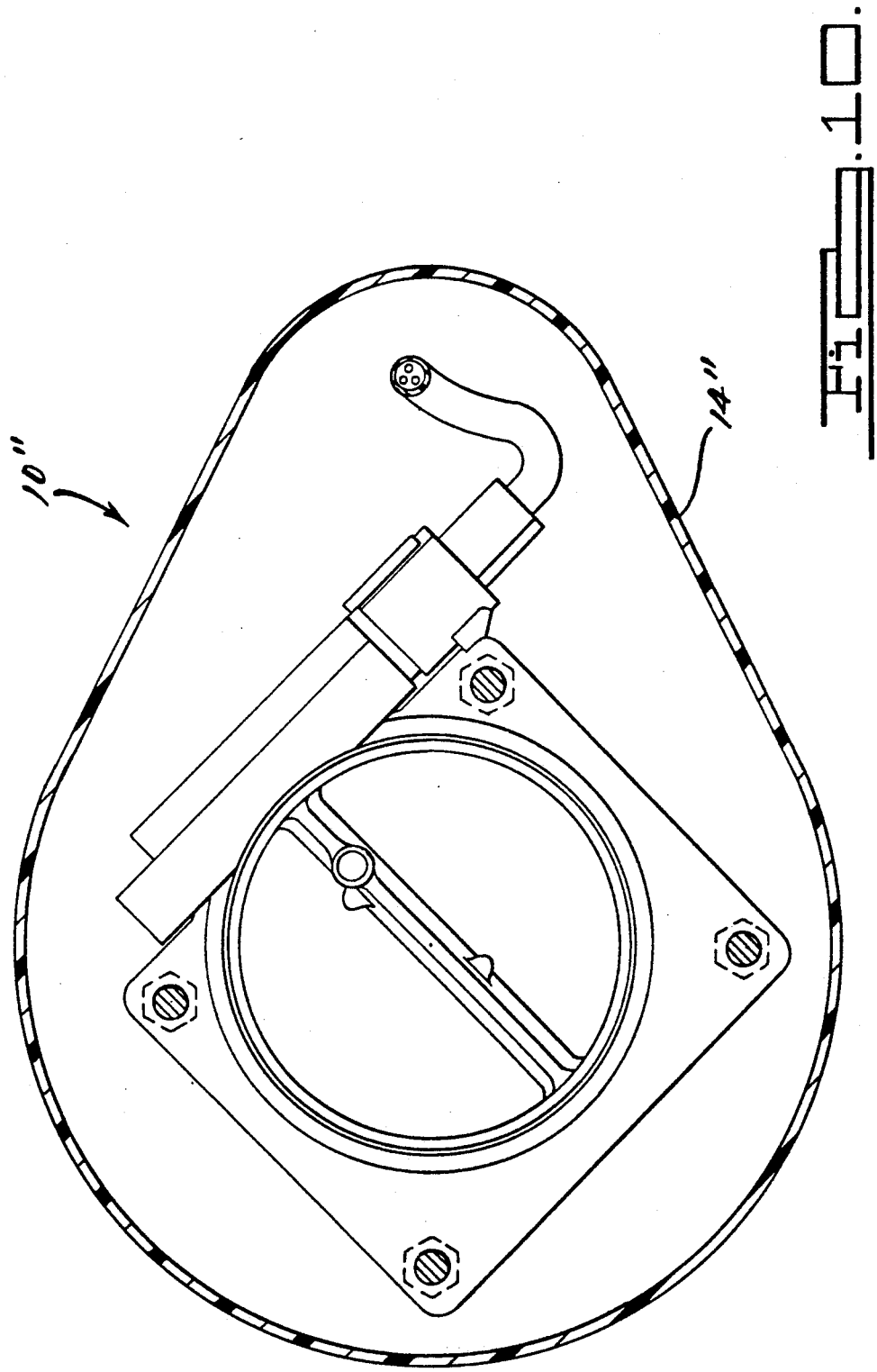

AIR CLEANER/NOISE SILENCER ASSEMBLY

This is a continuation-in-part application of U.S. patent application Ser. No. 07/633,928, filed Dec. 26, 1990, and incorporated herein by reference.

FIELD OF THE INVENTION

This invention relates, in general, to a combination engine air cleaner and noise silencer to provide both a source of filtered air to an engine and to reduce transmitted induction noise.

BACKGROUND OF THE INVENTION

Combination air filters and noise silencers are known. Air filters are used to provide a source of filtered air to an internal combustion engine. Noise silencers are used to prevent the transmission of induction noise. Induction noise is sound generated by an engine and includes combustion, valve, timing chain or belt, cam shafts, oil pumps, and other noises. Induction noise also includes the noise generated by intake air flowing through a constriction or irregular surface.

One example of a combination air filter/noise silencer is shown and described in U.S. Pat. No. 4,713,097, issued to Grawi et al, Dec. 15, 1987. Grawi et al shows a combination air filter/noise silencer having upper and lower portions. The lower portion contains an air inlet and an air filter element from which clean air is supplied to the upper portion and to a chamber leading to the inlet of a venturi that extends at right angles to the chamber. Concentric with the venturi is a dead air space type resonating chamber having an inlet concentric with the outlet of the diffuser of the venturi. This results in engine noise feedback either being dissipated in the resonating chamber or captured in the diffuser portion of the venturi to be deflected by the tapering walls back to the engine.

A similar engine air filter/noise silencer is shown and described in U.S. Pat. No. 4,790,864, issued to Kostun, Dec. 13, 1988. Kostun features an air cleaner/noise silencer that includes a compact, elongated housing having an air inlet at one end and a flat, upright filter at the opposite end to which the air inlet is connected through the housing by an elongated sound attenuating first venturi.

Both Grawi et al and Kostun require the unfiltered air to abruptly change directions before passing through a flat filtering element. This change of direction creates a disturbance of the air flow through the filter and the outlet of the air cleaner.

U.S. Pat. No. 4,157,902, issued to Tokar, June 12, 1979, discloses a conical filter element and a cone-shaped streamliner. The streamliner has a base of larger diameter than the filter element and directs the flow of air around the exterior of the filter element. The entire filter media is not used for filtering and requires long filter elements. Air is directed around the upstream portion of the filter media. Tokar uses a cylindrical housing of uniform diameter which does not assist in pressure recovery as air passes through the air cleaner.

U.S. Pat. No. 4,710,297, issued to Suzuki et al, Dec. 1, 1987, discloses a cylindrical filter element receiving an airflow between its pleated segments. However, Suziki et al also uses a cylindrical housing of uniform diameter and the airflow is directed through the flattened base portion of the filter element and not through the filter element pleats.

U.S. Pat. No. 4,782,912, issued to Wandless, Nov. 8, 1988, teaches an air cleaner/noise silencer using a conical-like insert in a snorkle-like air inlet. The insert directs air to gradually tapering walls and provides good air pressure recovery. The interior of cone also acts to reflect engine induction noise back toward the source. But Wandless teaches the use of a flat filter element perpendicular to the airflow.

Among the primary objects of this invention is to provide a noise attenuating air cleaner which produces minimal airflow constriction and linearly directs the flow of air through a mass airflow sensor. The invention also provides engine induction noise attenuation through the use of noise reflecting surfaces and a resonating chamber. The symmetrical nature of the air cleaner/noise silencer assembly construction provides a space efficient compact design.

SUMMARY OF THE INVENTION

The invention relates to an air cleaner comprising a generally bell-shaped air cleaner housing and a generally frustoconical filter positioned concentrically within the housing. The housing has an air inlet at its small end and an air outlet at its large end for directing the flow of air generally axially into and out of the housing. The filter has a filter element coaxially juxtaposed to the interior surface of the housing. The filter element is generally annular and has an upstream portion and an downstream portion. The downstream portion of an air directing member supportably engages the upstream portion of the filter element. The upstream portion of the filter element has a diameter larger than the diameter of the member downstream portion. The member blocks the flow of air into the interior of the filter element and directs air axially along the exterior of the filter element. A downstream annular support piece engages the downstream end of the filter element. The support piece has an aperture communicating with the outlet and with the interior of the filter element. The support piece sealably engages the interior surface of the housing. Air flowing in an axial direction through the inlet passes over the member, axially along the filter element a distance before passing through into the interior of the element and axially out the outlet.

The member is preferably nose-cone shaped and the filter element is made from a pleated material. The nose-cone directs the flow of incoming air axially along and between the filter pleats. The cone has an upstream portion and a downstream portion. The cone acts to reflect engine generated induction noise back toward the engine. The filter element has an upstream portion and a downstream portion. The diameter of the filter element upstream portion is larger than the diameter of the cone downstream portion. The cone acts to direct the flow of air axially along and between the pleats of the filtering element. The invention positions the air filtering element within a bell-shaped chamber, evenly distributes the airflow along the filter media, and minimizes the total space required by the air cleaner.

The air cleaner may be used alone or in combination with a resonator. In the preferred embodiment of the invention a resonator is attached downstream to the air cleaner to form an air cleaner/noise silencer assembly. A resonator inlet receives filtered air from the air cleaner outlet. A resonator chamber concentric with the resonator inlet cancels engine induction noise. A mass airflow sensor positioned downstream of the resonator inlet measures the laminar air flowing through the assembly.

The low pressure drop and laminar airflow of the assembly reduces the area of filter media required and increases the precision of the mass airflow sensor. The elimination of planar reflecting surfaces reduces noise propagation through the assembly and shell noise.

These as well as other objects, features, and advantages of the invention will become more apparent to one of ordinary skill in the art upon reference to the following detailed description and drawings.

BRIEF DESCRIPTION OF THE DRAWINGS

FIG. 1 is an exploded perspective view of the air cleaner/noise silencer assembly of the invention.

FIG. 2 is a longitudinal cross-sectional view of the air cleaner/noise silencer assembly shown in FIG. 1.

FIG. 3 is an enlarged view of the area marked FIG. 3 in FIG. 2.

FIG. 4a is an enlarged cross-sectional view of the air cleaner/noise silencer assembly shown in FIG. 2 taken along the line 4a—4a.

FIG. 5 is an enlarged cross-sectional view of the air cleaner/noise silencer assembly shown in FIG. 2 taken along the line 5—5.

FIG. 9 is a perspective view of a second alternative embodiment of the air cleaner/noise silencer.

FIG. 10 is a cross-sectional view of the air cleaner/noise silencer assembly shown in FIG. 9 taken along the line 10—10.

DETAILED DESCRIPTION OF THE PREFERRED EMBODIMENT

Figure 4A:
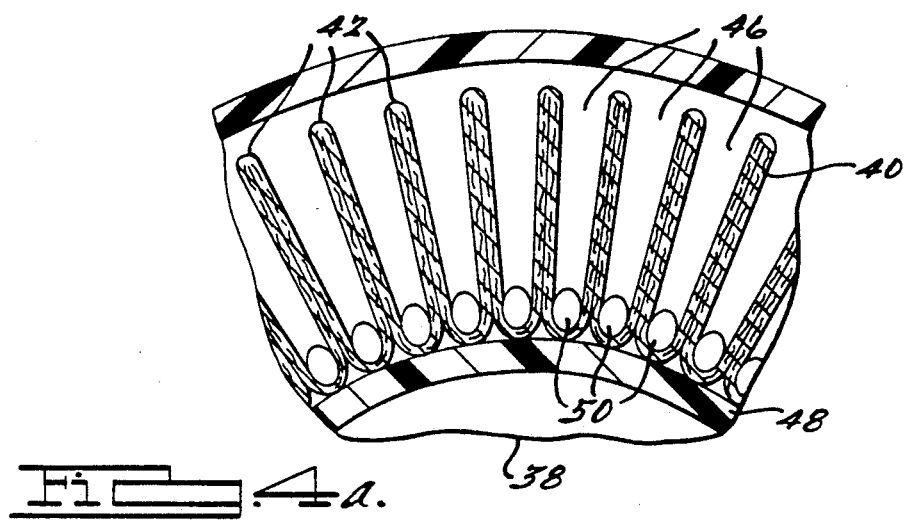

The preferred embodiment of the present invention provides a combination air cleaner and noise silencer assembly. The air cleaner and air filter of the present invention may be use alone or in combination with the resonator. An exploded view of the air cleaner/noise silencer assembly 10 is shown in FIG. 1. Air cleaner/noise silencer assembly 10 comprises an air cleaner housing 12 and a resonator housing 14. Housings 12 and 14 are generally cylindrical and attached to one another by means Of one or more closure clamps 15. Internal of assembly 10 are air filter 16, support member 18, and mass airflow sensor 20.

Housing 14 is designed to be easily disengageable from housing 12 to permit the replacement of air filter 16. When used in an automotive environment, one housing is made stationary and the outer housing is movable to enable the replacement of the air filter. In the present invention, flange 62 on housing 12 secures assembly 10 to the vehicle (not shown). A flexible hose (not shown) attached to resonator housing 14 permits housing 14 to swing away from housing 12 to expose air filter 16. Alternatively, housing 14 can be fixed relative to housing 12.

Housing 12 comprises air inlet 23 for receiving unfiltered air. Housing 14 includes an air outlet (not shown) to supply filtered air to an engine (not shown). In the preferred embodiment of the present invention, assembly 10 is intended to fit a variety of vehicles. In some applications, it is useful to draw in ambient air from a location remote from assembly 10. Inlet 23 is designed to receive a variety of tubes, hoses, and airflow directing means by a snap-on connection. Referring to FIGS. 2 and 3, snorkle 24 is shown attached to air inlet 23. Extension 26 engages detent 28 and secures snorkel 24 to inlet 23 by a snap-on fit. Snorkel 24 provides a steeply convergent venturi at passage 30 for receiving unfiltered air. Other airflow directing means such as tubes, hoses, elbows, or tee-shaped fittings may be attached to inlet 23 to provide a source of ambient unfiltered air to assembly 10.

Air cleaner housing 12 generally contains three passages as shown in FIG. 2. Passage 32 provides a slightly divergent venturi at an angle of approximately 3.5° to alleviate a pressure increase due to the speed of air flowing through this portion of housing 12. Passage 34 provides a widely divergent venturi and passage 36 provides a slightly divergent venturi at an angle of approximately 3.5°. Located concentric within passages 34, 36 is air filter 16.

Air filter 16 comprises a nose-cone shaped member 38 centered in the throat area of passage 34. Cone 38 is generally annular and contains a blunt portion upstream of an airflow and a base portion positioned downstream. Attached to the base portion of cone 38 is filter element 40. Filter element 40 can be generally cylindrically-shaped, but is more preferably generally frustoconically-shaped as shown in FIG. 2. The frustoconical shape provides an improved pressure recovery for air passing through housing 12 and more even loading of contaminant on filter element 40.

Figure 4B:
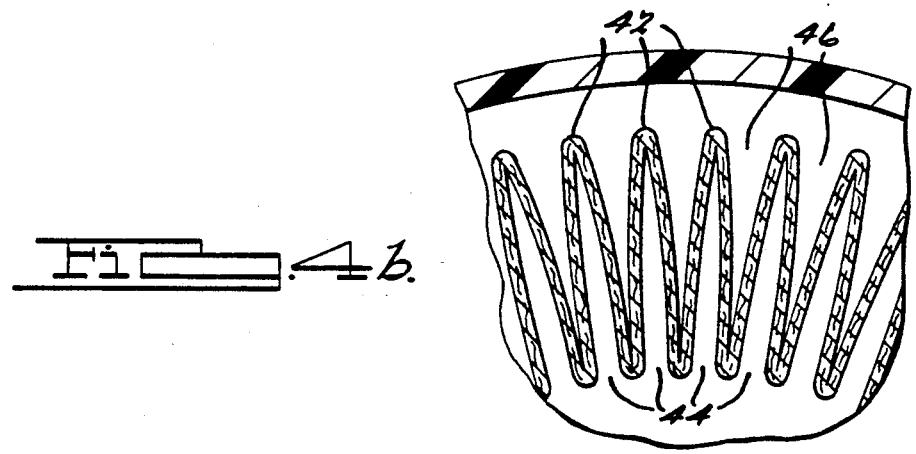
FIG. 4b is an enlarged cross-section view of the air cleaner/noise silencer assembly shown in FIG. 2 taken along the line 4b—4b.

Filter element 40 comprises a pleated paper type filtering material. Other suitable materials may be used for filter element 40 such as natural and synthetic fabric pleated material including nylon, polyester, and cotton. Filter element 40 is folded in a manner to define a series of circumferentially arranged and axially extending pleats 42 as shown in FIGS. 4a—4b. Pleats 42 have pairs of walls defining axially extending interior channels 44 and axially extending exterior channels 46. The upstream ends of each pair of walls defining an interior channel 44 is sealed by heat bonding as shown in FIG. 5.

Individual pleats 42 are spaced about the base of cone 38 as shown in FIG. 4a. Lip 48 on the base of cone 38 supports filter element 40. Finger-like projections 50 about the base of cone 38 maintain an even spacing between exterior channels 46. Alternatively, a bead of adhesive placed along the perimeter of lip 48 may be used to form finger-like beads of adhesive to space pleats 42 and attach cone 38 to filter element 40. Cone 38 blocks the flow of air into the interior of filter element 40 and directs air axially along exterior channels 46.

A urethane ring 52 secures the downstream ends of pleats 42. Ring 52 is formed in-situ about filter element 40. Ring 52 defines air cleaner outlet 54 which communicates with the interior portion of air filter 16. The downstream ends of exterior channels 46 are blocked by ring 52 and air flowing through filter element 40 is forced to pass from exterior channels 46 to interior channels 44. Ring 52 also acts to position air filter 16 within air cleaner housing 12 and becomes sealably engaged between housing 12 and housing 14.

Air filter 16 is manufactured by forming an annular ring of pleated filter material. The material is placed in a mold used to form ring 52. The downstream end of pleats 42 are spaced slightly above the mold bottom. A urethane material is poured into the mold and allowed to cure about pleats 42. Cone 38 is secured to the upstream end of pleats 42 with an adhesive.

Air filter 16 is designed to be easily replaceable. Cone 38 can- be either removably or permanently attached to the upstream portion of filtering element 40. The preferred embodiment of cone 38 is a lightweight plastic cone which is permanently affixed to the upstream portion of filtering element 40. Cone 38 acts to support the interior of filter element 16 and evenly spaces pleats 42 to maintain a space for air to flow between exterior channels 46.

Pleats 42 extend radially a distance beyond the base portion of cone 38. A pleat length of between $\frac{3}{4}$ inch and 1-$\frac{1}{2}$ inches was found useful for use in automotive applications. Pleats longer than 1-$\frac{1}{2}$ inches were found to vibrate when exposed to high-speed air induction. These vibrations disturbed the laminar air flow. Pleat lengths less than $\frac{3}{4}$ inch required longer and wider filter elements to achieve the required efficiencies.

Figure 6:
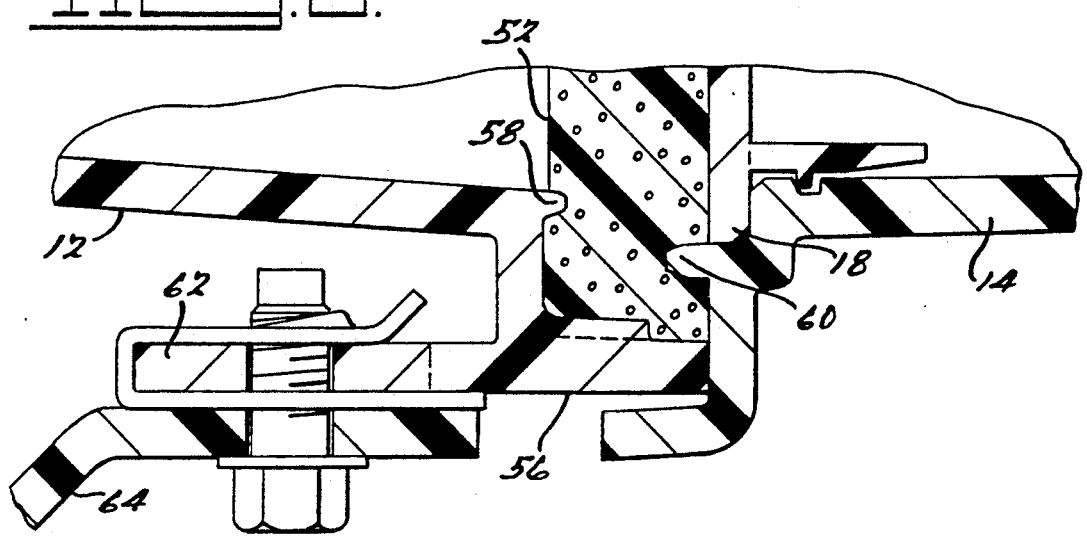
FIG. 6 is an enlarged view of the area marked FIG. 6 in FIG. 2.

Ring 52 is secured between housing 12 and housing 14 as illustrated in FIG. 6. Lip portion 56 on housing 12 radially confines and concentrically aligns ring 52. Projections 58, 60 on housings 12, 14 respectively compress ring 52 to form an air-tight seal between the internal portions of assembly 10 and the ambient air. Ring 52 also forms a seal between the housing 12 and housing 14.

Support member 18 is attached to housing 14 by a series of peripherally-spaced extension tabs 61 and detents 63. Support member 18 is retained within housing 14 when the filter elements is replaced. Flange 62 on housing 12 is used to secure assembly 10 to the vehicle. Bracket 64 is secured at one end to the vehicle (not shown). The other end of bracket 64 is bolted to flange 62. The air cleaner described may be used alone to provide a source of filtered air to an engine. Additionally and preferred is use of the air cleaner in combination with a resonator.

The resonator portion of assembly 10 comprises support member 18 which carries mass airflow sensor 20 as shown in FIG. 2. Support member 18 includes passage 66 which provides a converging venturi receiving the flow of air from air filter 16. Passage 66 is not required for the invention, but permits the use of a mass airflow sensor of smaller diameter than the downstream diameter of air outlet 54. Mass airflow sensor 20 is secured to support member 18 and receives the flow of air from passage 66. Mass airflow sensor 20 contains means for determining the quantity of air passing through assembly 10. Mass airflow sensor 20 may also optionally contain means for measuring the temperature and pressure of the airflow. A diverging venturi passage 68 on the downstream portion of mass airflow sensor 20 provides a pressure recovery for air passing through the mass airflow sensor. Air passes though housing 14 and exits at resonator outlet 70. Outlet 70 is spaced axially downstream of passage 68. Outlet 70 has a diameter larger than passage 68 and permits approximately a 3.5° expansion of the airflow. This expansion acts as an additional pressure recovery for air entering the engine.

Resonating chamber 72 comprises the space between housing 14 and the exterior surface of mass airflow sensor 20. Resonator chamber 72 contains a resonator inlet 74 concentric about and downstream of passage 68. Resonating chamber 72 receives induction noise from the engine through resonator outlet 70 and resonator inlet 74.

The axial spacing between outlet 70 and passage 68, the internal diameter of mass airflow sensor 20 as well as the dimensions of chamber 72 can be appropriately sized to cancel a specific engine induction noise frequency or a broad range of frequencies. A method for sizing an expansion chamber such as chamber 72 is taught in Eriksson, L. J., Thawani, P. T., and Hoops, R. H., "Acoustical Design and Evaluation of Silencers", *Sound and Vibration*, July 1983, pp 20–327; "Noise and Vibration Control", Chapter 3.2.1, Leo Beranek, McGraw-Hill Book Company, 1971; and "Noise Control for Internal Combustions Engines", Chapter 12.2, Donald E. Baxa, Wyley-Interscience, 1981, all incorporated herein by reference.

Figure 7:
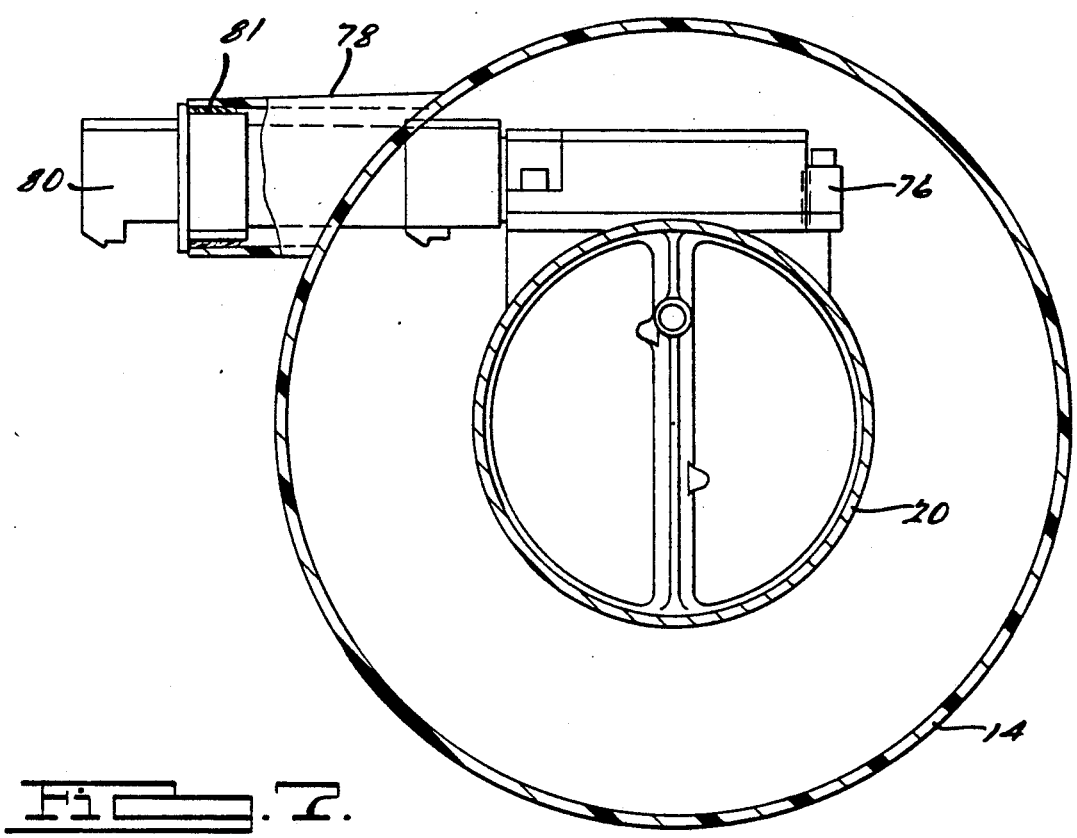
FIG. 7 is a cross-sectional view of the air cleaner/noise silencer assembly shown in FIG. 2 taken along the line 7—7.

Mass airflow sensor 70 contains an electronic module 76. Module 76 receives a connector which communicates with an electronic engine controller. As shown in FIG. 7, housing 14 includes tubular extension 78. Connector 80 is inserted through extension 78 and attaches to module 76. 0-ring type seals 81 on connector 80 seal resonator chamber 72 from leakage. Alternatively, a cable-type connector can be inserted through a rubber grommet to connect module 76 to the engine controller. Tabs 82 on housing 14 and support member 18 align with slot 84 as shown in FIG. 1. This also aligns connector 80 with extension 78 as shown in FIG. 7.

Air filter 16 is sized to the requirements of an engine. The area of the filter material and hence the length and diameter of filter element 40 is dependent on the efficiency of the filter media used and the airflow speed required. Using conventional paper filter material, the following table lists capabilities for three air cleaner/noise silencer assembly sizes:

TABLE I

| Type | 1 | 2 | 3 |
|---|---|---|---|
| Overall Length (mm) | 474 | 476 | 479 |
| Overall Diameter (mm) | 169 | 189 | 221 |
| Rated Flow (SCFM) | 250 | 350 | 500 |
| Pressure Drop ("H2O) | 8 | 8 | 8 |
| Dust Capacity (gms ACC) | 100 | 100 | 100 |
| Filter Efficiency (%) | 98.5 | 98.5 | 98.5 |

Pressure drop through the filter was found to be relatively low when compared to conventional flat filter designs. Additionally, the dust capacity of the filter per unit area of filter media was found to be higher. The lower pressure drop is believed to be due to the streamlining of the airflow through the assembly. Blunt surfaces and abrupt airflow direction changes are avoided. Filter loading is increased because the filter loads more evenly. In pleated-type filters which are impacted by an airflow at a near right angle, contaminants tend to load from the bottom of the pleats upward. Once the pleat bottoms fill with dust, the pressure drop through the filter increases and the filter must be replaced. Right angle airflow through a filter also makes uniform coverage of the entire filter area difficult. Some areas become more loaded with dust and partially block the airflow. The airflow is then diverted to the areas of less blockage. This redirection often increases turbulence and reduces the efficiency of the filter.

By directing the airflow between the pleats a distance axially before passing through the filter, the efficiency and capacity of the air filter is increased and the pressure drop decreased. By using a bell-shaped air cleaner housing, airflow can be evenly distributed along the filter element. Airflow is assisted by streamlining all portions of assembly 10 which directly contact the air stream. Inlet 23 is provided with a relatively narrow opening owing to the effective pressure recovery of passages 32, 34, and 36. The angle of passage 32 was selected to slow the airflow and aid in pressure recovery. Passage 36 is also diverging, but not to as large a degree as passage 34 because part of the airflow is being progressively removed through the filter element.

The flow of unfiltered air passes about the exterior surface of filter element 40 and discrete contaminant particles are filtered from the flow of air as shown in FIG. 2. The flow of filtered air passes through air filter 16 and is directed to mass airflow sensor 20.

Sound attenuation is also achieved through the use of the bell-shaped housing and air filter design of the present invention. While not wishing to be bound by the following theories, it is believed that sound attenuation for assembly 10 occurs through the individual and cooperative noise silencing features described above. Resonating chamber 72 partially cancels induction noise entering assembly 10 through resonator outlet 70. The series of converging/diverging venturi passages also assists in cancelling induction noise that passes through assembly 10 by dissipating sound waves along the passage walls. The converging/diverging venturi cause an area change in the airflow path which causes a change in the impedance of noise passing through the assembly. The change in impedance reflects noise back to its source. Passage 34 contains cone 38 which also acts to limit high frequency noise propagation. Cone 38 causes a change in the cross-sectional area of passage 34, thus creating an impedance change which reflects noise back toward the engine. Ring 52 and passage 66 act as an acoustic contraction yielding the assembly a multichamber device. This contraction is also a change in impedance. Mass airflow sensor 20 acts as an acoustic extension into resonator chamber 72. The length and diameter of mass airflow sensor 20 together with the dimensions of resonator chamber 72 cooperatively act to effectively attenuate noise.

The annular cross-section shape of assembly 10 limits the amount of shell noise that can be radiated by the housings to the passenger compartment. This differs from direct transmission loss through the structure, which is independent of its rounded shape. Additionally, the designs shown in FIGS. 1-7 do not provide a linear sound path for the engine induction noise to travel, nor a planar wall surface that reflects induction noise through assembly 10.

Engine induction noise traveling through assembly 10 begins at resonator outlet 70. Noise which travels through the mass airflow sensor 20 is reflected from the interior of filter 16 by the cup-shaped interior surface of cone 38. Sound which passes through filter element 40 is again reflected back toward the engine by the walls of passages 32, 34, and 36. Only a relatively small amount of noise escapes the assembly through air inlet 23.

The invention described provides a compact design for an air cleaner/noise silencer assembly. Resonator chamber 72 can be efficiently housed concentrically about mass airflow sensor 20. Filter element 40 is located in the throat section of passage 34. The linear arrangement of air filter 16 and mass airflow sensor 20 provides a smooth and nearly laminar flow of air through the mass airflow sensor. This uniform and near laminar flow of air is useful for an accurate measurement of air volume by the mass airflow sensor.

The invention also provides an effective design for reducing the pressure drop of air passing through assembly 10. Filter element 40 is centrally located in expansion passages 34, 36. As air passes through inlet 23, it encounters the widely diverging walls of passage 34, which results in a large pressure drop in passage 36. The decreased pressure in passage 36 is believed to permit a greater volume of air to pass through filter element 40. Passage 36 acts to increase the velocity of the airflow while simultaneously reducing the air pressure. The increased velocity, combined with reduced pressure, enhances the overall volumetric efficiency of the air cleaner. Air is directed axially by the walls of passage 34 along and through air filter 16.

The flow of air around cone 38 and axially along and between exterior channels 46 is believed to minimize the disturbance in the airstream caused by air filter 16. This axial flow of air minimizes air turbulence in the air cleaner and noise generated therefrom. Additionally, the decreased turbulence assists in the measuring capability of mass airflow sensor 20. The axial relationship between the flow path and filter element reduces the likeliness of large particulates puncturing the filter element. By evenly distributing the incoming airflow around the filter element, all of the filtering media is used. Dust is loaded uniformly on the filter element. This increases the capacity of the air cleaner for a given area of filtering element. The airflow through filter element 40 remains smooth and uniform even when it is partially loaded with dust, thus increasing the accuracy of mass airflow sensor 20 under all normal driving conditions. It has been found that the efficiency of filter element 40 in removing dust increases when it becomes partially loaded. By extending the useful life of filter 16, better protection is afforded to engine over a longer period of time than the frequent replacement of flat filters.

Figure 8:
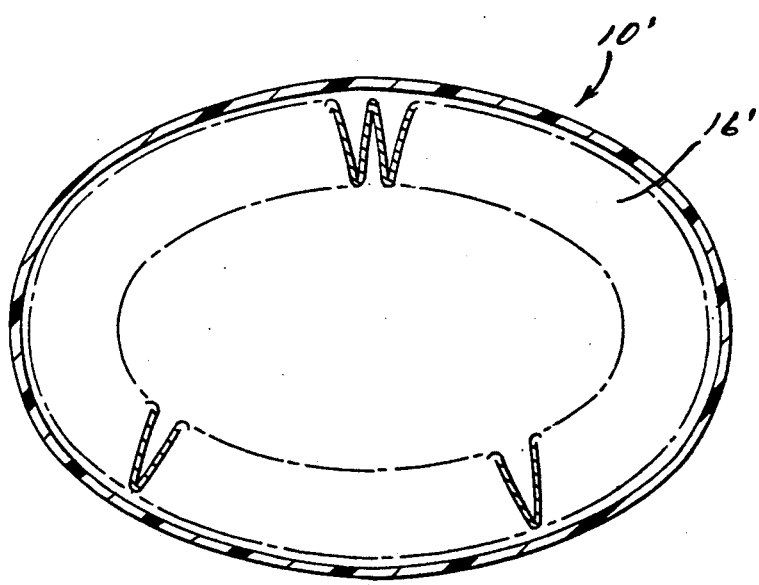
FIG. 8 is a transverse cross-sectional view of an alternative embodiment of the air cleaner/noise silencer showing an ovalized construction.

In a first alternative embodiment of the invention, assembly 10' and filter element 16' are oval-shaped as shown in FIG. 8. In some applications, it is useful to have an ovalized assembly to fit within a confined area. A second embodiment of the invention is shown in FIGS. 9 and 10. Assembly 10" has an air cleaner portion 12" with an angled air inlet 23". This is useful for confined applications. The volume of resonator portion 14" is enlarged by providing a partially ovalized cross-section as shown in FIG. 10. The remainder of assembly 10" operates as described in FIGS. 1-7.

From the foregoing description of the preferred embodiments, it is seen that the invention provides a two-piece air cleaner/noise silencer assembly which combines a noise reducing series of converging-diverging venturi together with a resonator chamber and air directing cone. The design provides for a smooth, nonturbulent flow of air through the air cleaner and mass airflow sensor. Its linear, compact configuration provides for a packaging advantage in locating the air cleaner/noise silencer assembly in a crowded engine compartment bay.

While the invention has been shown and described in its preferred embodiments, it will be clear to those skilled in the arts to which it pertains that many changes and modifications may be made thereto without departing from the scope of the invention as set forth in the following claims.

We claim:

1. An air filter, comprising:
   a generally annular filter element made of thin filter material folded in a manner to define a series of circumferentially arranged and axially extending pleats, said element having an upstream end and a downstream end, said pleats having pairs of walls defining axially extending interior and axially extending exterior channels;
   means sealing the upstream ends of each pair of walls defining an axially extending interior channel whereby the upstream end of each interior channel is closed and the upstream end of each of said exterior channel is open to permit the flow of air therealong;
   an upstream annular member supportingly engaging the upstream radial inner edges of said pleats, said upstream annular member blocking the flow of air into the interior of said filter element and directing air axially along said exterior channels; and
   a downstream ring securing the downstream axial ends of said pleated material, said ring defining an outlet communicating with the interior of said filter element and blocking the downstream ends of said exterior channels;
   whereby air flowing from said upstream end toward said downstream end is directed axially a distance along said exterior channels through said filter element and out said outlet.

2. The air filter of claim 1 wherein said upstream annular member is nose-cone shaped.

3. The air filter of claim 1 wherein said upstream annular member has a nonplanar surface communicating with the interior of said filter element.

4. The air filter of claim 1 wherein said upstream annular member comprises a series of projections circumferentially spacing the upstream radial inner edges of said pleats about said upstream annular member.

5. The air filter of claim 1 further comprising an adhesive bead of material securing said upstream annular member to the upstream radial inner edges of said pleats, said bead of material forming finger-like projections between pleats.

6. The air filter of claim 1 wherein said sealing means is heat bonding.

7. An air cleaner, comprising a generally bell-shaped air cleaner housing and a generally frustoconical filter positioned concentrically within said housing;
   said housing having an air inlet at its small end and an air outlet at its large end for the flow of air generally axially into and out of said housing;
   said filter having a filter element coaxially juxtaposed the interior surface of said housing, said filter element being generally annular and having an upstream portion and a downstream portion;
   a member having an upstream portion and a downstream portion, said downstream portion of said member supportably engaging said upstream portion of said filter element, and said upstream portion of said filter element having a diameter larger than the diameter of said member downstream portion, said member blocking the flow of air into the interior of said filter element and directing air axially along said exterior of said filter element; and
   a downstream ring engaging the downstream end of said filter element, said ring having an aperture communicating with said outlet and with the interior of said filter element, said ring sealably engaging the interior surface of said housing;
   whereby air flowing in an axial direction through said inlet passes over said member, axially along said filter element a distance before passing through into the interior of said element and axially out said outlet.

8. The air cleaner of claim 7, and further comprising a resonator means having a closed chamber communicating with said outlet to suppress noise.

9. The air cleaner of claim 7, and further comprising a mass airflow sensor connected to said outlet for measuring the volume of air passing through said air cleaner.

10. The air cleaner of claim 7, wherein a transverse cross-section of said bell-shaped housing is oval-shaped.

11. An air cleaner/noise silencer assembly, comprising:
    a housing having an air cleaner portion and a resonator portion, said air cleaner portion having an ambient air inlet and said resonator portion having a resonator outlet;
    a frustoconical filter element coaxially positioned in said air cleaner portion, said filter element having an upstream portion and a downstream portion;
    a nose-cone shaped member having an upstream portion and a downstream portion, said downstream portion of said member positioned coaxial and adjacent said upstream portion of said filter element; and
    a ring attached to said filter element downstream portion and defining an air cleaner outlet, said ring sealably engaged between said air cleaner portion and said resonator portion, said resonator outlet communicating with said air cleaner outlet;
    whereby air flowing in an axial direction through said inlet passes over said member through into the interior of said element and axially out said resonator outlet.

12. The air cleaner/noise silencer of claim 11, wherein said inlet comprises means receiving an air directing member.

13. The air cleaner/noise silencer of claim 12, wherein said receiving means is a snap-on connector.

14. An air cleaner/noise silencer assembly comprising:
    a housing having a bell-shaped air cleaner portion and a resonator portion, said air cleaner portion having an ambient air inlet at its small end and said resonator portion having a resonator outlet;
    a frustoconical filter element coaxially positioned in said air cleaner portion, said filter element having an upstream portion and a downstream portion;
    a nose-cone shaped member having an upstream portion and a downstream portion, said downstream portion of said member positioned coaxial and adjacent said upstream portion of said filter element, and said upstream portion of said filter element having a diameter larger than the diameter of said member downstream portion, said member blocking the flow of air into the interior of said filter element and directing air axially along the exterior of said filter element; and
    a ring attached to said filter element downstream portion and defining an air cleaner outlet, said ring sealably engaged between said air cleaner portion and said resonator portion, said resonator outlet communicating with said air cleaner outlet;

whereby air flowing in an axial direction through said inlet passes over said member, axially along said filter element a distance before passing through into the interior of said element and axially out said resonator outlet.

15. The air cleaner/noise silencer assembly of claim 14, wherein said ambient air inlet has a means receiving an air directing member.

16. The air cleaner/noise silencer assembly of claim 14, wherein said ring is made of a compressible material and is axially compressed between said air cleaner portion and said resonator portion.

17. The air cleaner/noise silencer assembly of claim 14, further comprising a passage communicating between said resonator outlet and air cleaner outlet, said resonator portion concentric about said passage and defining a resonator chamber, said resonator chamber communicating with said resonator outlet.

18. The air cleaner/noise silencer assembly of claim 17, wherein said passage has an upstream end attached to said air cleaner outlet and a downstream end axially spaced a distance from said resonator outlet.

19. The air cleaner/noise silencer assembly of claim 17, further comprising a mass airflow sensor within said passage measuring the airflow through said assembly.

20. The air cleaner/noise silencer assembly of claim 19, further comprising an aperture in said resonator portion sealably receiving a connector means, said connector means communicating with said mass airflow sensor.

21. The air cleaner/noise silencer assembly of claim 19, further comprising a means supporting said mass airflow sensor concentrically within said resonator portion.

* * * * *

UNITED STATES PATENT AND TRADEMARK OFFICE
CERTIFICATE OF CORRECTION

PATENT NO. : 5,106,397
DATED : April 21, 1992
INVENTOR(S) : Jaroszczyk et al

It is certified that error appears in the above-indentified patent and that said Letters Patent is hereby corrected as shown below:

On the title page, Inventors, item [75], please add the following name: "Thomas E. Reilly, Ferndale, Mich."

Signed and Sealed this

Twenty-fourth Day of August, 1993

Attest:

BRUCE LEHMAN

*Attesting Officer*  *Commissioner of Patents and Trademarks*